US 9,752,872 B2

(12) United States Patent
Sausen et al.

(10) Patent No.: US 9,752,872 B2
(45) Date of Patent: Sep. 5, 2017

(54) ALIGNMENT ADJUSTING DEVICE

(71) Applicant: Airbus DS GmbH, Taufkirchen (DE)

(72) Inventors: Daniel Philipp Sausen, Wolken (DE);
Juergen Hinger, Immenstaad (DE);
Peter Weimer, Markdorf (DE)

(73) Assignee: Airbus DS GmbH, Taufkirchen (DE)

( * ) Notice: Subject to any disclaimer, the term of this patent is extended or adjusted under 35 U.S.C. 154(b) by 8 days.

(21) Appl. No.: 14/706,321

(22) Filed: May 7, 2015

(65) Prior Publication Data
US 2015/0323317 A1 Nov. 12, 2015

(30) Foreign Application Priority Data

May 8, 2014 (EP) .................................... 14001617

(51) Int. Cl.
*G01B 11/00* (2006.01)
*G01B 11/27* (2006.01)
*G02B 7/00* (2006.01)

(52) U.S. Cl.
CPC .......... *G01B 11/272* (2013.01); *G02B 7/004* (2013.01)

(58) Field of Classification Search
CPC .......... G01B 11/00; G02B 7/00; G02B 27/00; G03B 19/00; G03B 17/00
USPC .................................................. 356/399–401
See application file for complete search history.

(56) References Cited

U.S. PATENT DOCUMENTS

| 6,327,034 B1* | 12/2001 | Hoover ................. G03F 7/7035 355/53 |
| 8,430,580 B2* | 4/2013 | Gutierrez ............. H04N 5/2254 396/529 |
| 8,908,260 B2* | 12/2014 | Long ........................ G03B 3/10 359/319 |
| 2003/0047660 A1 | 3/2003 | Gaunt et al. |
| 2005/0053113 A1* | 3/2005 | Clary ..................... G02B 7/003 372/108 |
| 2005/0126314 A1* | 6/2005 | Hirata ............... H01L 21/68728 73/865.8 |

(Continued)

FOREIGN PATENT DOCUMENTS

| EP | 0 179 456 A2 | 4/1986 |
| WO | WO 2004/040335 A2 | 5/2004 |

OTHER PUBLICATIONS

European Search Report dated Nov. 7, 2014 (eight pages).

*Primary Examiner* — Tarifur Chowdhury
*Assistant Examiner* — Isiaka Akanbi
(74) *Attorney, Agent, or Firm* — Crowell & Moring LLP

(57) ABSTRACT

An alignment adjusting device is provided for an optical focal plane assembly, wherein the optical focal plane assembly has a detector with a detector plane and is adapted to be mounted to an optics assembly having an optical focal plane. The alignment adjusting device is adapted for allowing an alignment of the detector plane representing an image area and the optical focal plane. The alignment adjusting device includes a detector support for receiving the detector; a plurality of members, wherein a first member of the plurality of the members is connected to the detector support and a second member is connected to a flange that is adapted to be connected to the optics assembly. The first member, the second member and the remaining number of the members are pairwise moveable connected to each other by a number of springs and/or supporting elements.

19 Claims, 5 Drawing Sheets

(56) References Cited

U.S. PATENT DOCUMENTS

2008/0170303 A1* 7/2008 Bieg ................ G02B 7/005
  359/811
2011/0102919 A1 5/2011 Song
2012/0013999 A1* 1/2012 Thomas ............ G01B 7/16
  359/811

* cited by examiner

Fig. 3
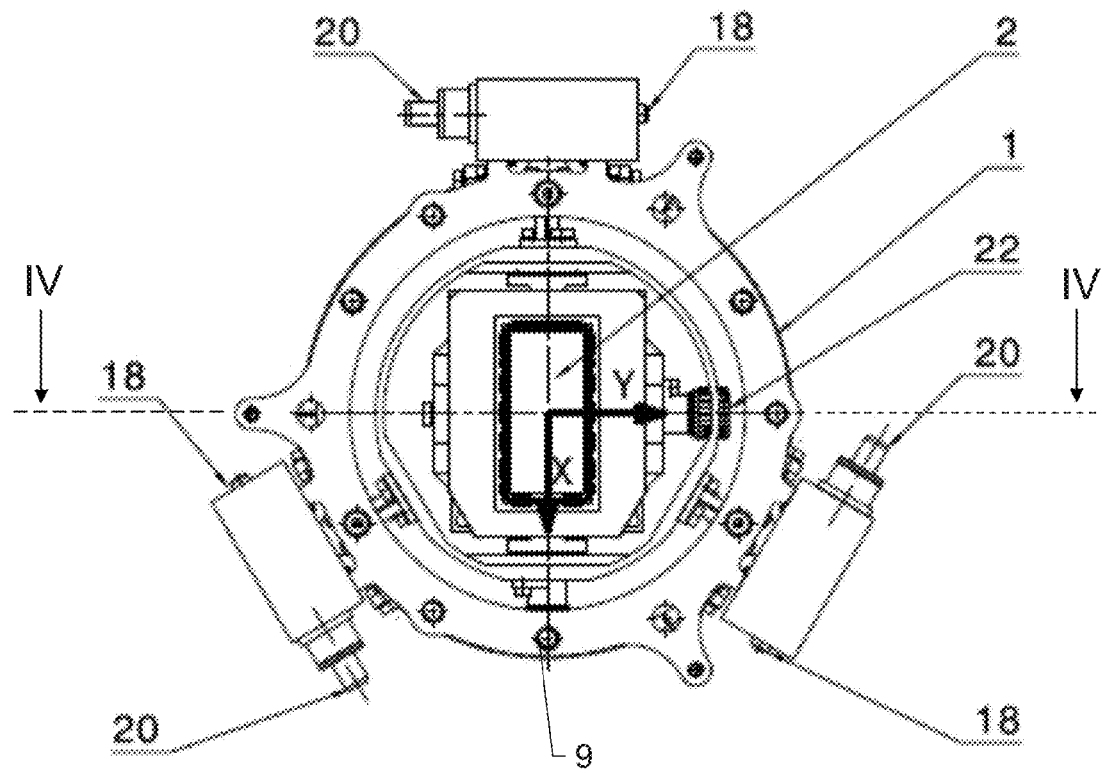
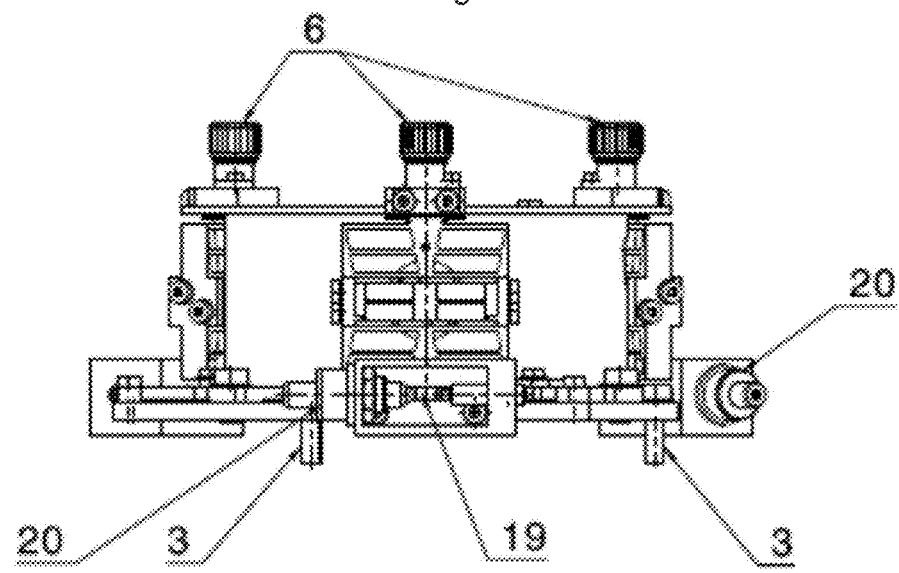
IV - IV
Fig. 4

ALIGNMENT ADJUSTING DEVICE

BACKGROUND AND SUMMARY OF THE INVENTION

The invention relates to an alignment adjusting device for an optical focal plane assembly. The alignment adjusting device is adapted to be integrated in an optical focal plane assembly comprising a detector having a detector plane and is adapted to be mounted to an optics assembly having an optical focal plane. The alignment adjusting device is adapted for allowing an alignment of the detector plane to the focal plane of the optics assembly, i.e. the optical focal plane.

Alignment adjusting devices are used for light detectors of optical instruments. The light detectors have to be adjusted with regard to the optical path micron precise. An alignment adjusting device which allows such an adjusting enables adjusting the optical focal plane assembly with regard to a predetermined length in any direction and/or around a predetermined angle around any axis. Conventional alignment methods require an exchange of precision stops or wedge rings which have to be manufactured true to dimension. Sometimes, the precision stops and wedge rings have to be dressed or to be newly manufactured. Furthermore, to make a change to the path and/or an angle of rotation it is necessary to exchange precision stops or wedge rings. By exchanging one of these parts, an already set orientation of the members of the alignment adjusting device has to be adjusted again. This makes the alignment process very complicated and time-consuming.

It is an objective of the present invention to provide an alignment adjusting device for an optical focal plane assembly which simplifies the alignment in any direction or around any rotation axis.

This objective is achieved by an alignment adjusting device according to the invention, wherein an alignment adjusting device for an optical focal plane assembly is suggested. The optical focal plane assembly comprises a detector having a detector plane and is adapted to be mounted to an optics assembly having an optical focal plane. The alignment adjusting device is adapted for allowing an alignment of the optical focal plane and the detector plane representing an image area. The alignment adjusting device comprises a detector support for receiving the detector and a plurality of members. A first member of the plurality of members is connected to the detector support and a second member of the plurality of members is connected to a flange that is adapted to be connected to the optics. A first member, the second member and the remaining number of the members are pairwise movable connected to each other by means of a number of springs and/or a number of supporting elements. The number of springs and/or the number of supporting elements is adapted to enable a translational movement along axes of a given coordinate system and/or a rotational movement around the axes of the given coordinate system. The given coordinate system may be a Cartesian coordinate system in which the three axes are arranged at right angles.

The alignment adjusting device makes use of springs and supporting elements, respectively, which allow a movement along one direction (axis) and a rotation around a single axis of rotation. The springs may be lengthened by a specific adjustment. After having finished the adjustment the springs will be fixed. During fixing the adjustment remains unchanged. This allows a separate adjusting of each degree of freedom (each axis of rotation and along each direction). Using of a number of springs and supporting elements allows an accuracy of one micron and five arcseconds, respectively, in any direction. Furthermore, the adjusting may be made in an arbitrary order.

To make the alignment of the optical focal plane and the detector plane, it is not necessary to demount the optical focal plane assembly from the optics assembly. Furthermore, it is not necessary to disassemble the alignment adjusting device in case an adjustment in an arbitrary direction or around an arbitrary axis of rotation is necessary.

Adjusting the optical focal plane and the detector plane may be made by hand or with help of simple standard tools.

According to a preferred embodiment, the number of springs may be adapted to enable the rotational movement around only one of the axes. According to a further embodiment, the number of supporting elements may be adapted to enable the translational movement in only one direction and/or to enable the rotational movement around only one of the axes. This allows an adjustment to be made in an arbitrary order. Furthermore, an adjustment around any of the axes of rotation or along one of the axes can be made independent from each other.

According to a further preferred embodiment, each of the remaining number of members is connected to exactly two other of the members. It is clear, that the first member of the plurality of members which is connected to the detector support is connected to one of the remaining number of members as well. This is a result of the feature that the members are pairwise moveable connected to each other. As well, the second member of the plurality of members which is connected to the flange is connected to one of the remaining number of members.

According to a further embodiment, the plurality of members consists of an intermediate ring representing the second member being connected to the flange by means of detachable lock bolts, an outer frame being firmly connected to the intermediate ring and having a substantially cylindrical shape, an inner frame being coaxially arranged to the outer frame and having a substantially cylindrical shape, a first flexible joint connected to the inner frame, and a second flexible joint representing the first member.

The first axis is the center-line of the coaxially arranged inner and outer frames. The outer frame may be rotated around the first axis with respect to the flange by a predetermined angle. After completion of this adjustment the detachable lock bolts will be fixed to the flange.

According to a further embodiment, each of the adjusting mechanisms may comprise a spring plunger and a first micrometer screw acting on an adjustment bar of the intermediate ring. The adjustment bar may be an integral part of the intermediate ring.

According to a further embodiment, the adjusting mechanism is mounted to the flange and is removable from the flange when the lock bolts are fixed. However, even after disassembling or removing the adjusting mechanism, a rotational movement of the members is no longer possible.

According to a further preferred embodiment, the inner frame is connected to the outer frame by means of three equidistantly distributed adjusted means enabling an adjustment of the inner frame, the first flexible joint and the second flexible joint along the first axis as well as a tilt around a second and a third axis according to the number and a mount of adjustment of the adjusting means.

Each adjusting means may comprise a third flexible joint, a second micrometer screw and a mount, wherein the inner frame is connected with the mount and wherein the third flexible joint is adjustable by the micrometer screw. A translational movement along the first axis may be achieved by a synchronous actuation of the three adjusting means. For a tilt around the second and the third axis the adjusting means, i.e. the micrometer screws, have to be individually rotated.

According to a further preferred embodiment, the alignment along the first axis as well as the tilt around the second and third axis is fixed by corresponding lock bolts. The three micrometer screws may be mounted to the outer frame and wherein the corresponding second micrometer screws may be removable from the outer frame when the lock bolts are fixed. Again, even after removing the three micrometer screws no more change with regard to the movement in the direction of the first axis and around the second and/or the third axis is possible.

According to a further preferred embodiment, the first flexible joint is connected to the inner frame such that, when actuating a corresponding third micrometer screw, a translational movement along the third axis is achieved. In addition, the second flexible joint may be connected to the first flexible joint such that, when actuating a corresponding fourth micrometer screw, a translational movement along the second axis is achieved. The first and the second flexible joint may be actuated independently from each other to achieve the designated adjustment position.

The third and/or the fourth micrometer screws may be removed or demounted by unscrewing after an alignment fixation by means of corresponding bolts.

With regard to the position of the detector support of the alignment adjusting device, the detector support may be attached close to the centre of the second flexible joint. This allows the detector to be positioned symmetrically with regard to the plane defined by the first and third axis as well as by the plane defined by the first and second axis.

The invention will be explained in more detail by reference to the accompanying figures. In the figures, like reference numerals designate like elements.

BRIEF DESCRIPTION OF THE DRAWINGS

FIG. 3 shows a plane view of the alignment adjusting device from the side of the detector;

FIG. 4 shows a side view of the alignment adjusting device along the line IV-IV of FIG. 3;

DETAILED DESCRIPTION OF THE DRAWINGS

FIGS. 1 to 7 show an alignment adjusting device integrated in an optical focal plane assembly in different views. The optical focal plane assembly is mounted on an optics assembly which is not shown in the figures. Those elements such as thermal insulation, optical baffles, radiation shields, etc. which are not relevant for the alignment are not shown in the figures. The detector plane (image area) can be aligned with help of the alignment adjusting device described below. This alignment can be made with an accuracy of more than one micron in any direction, respectively five arcseconds around any axes of an Cartesian coordinate system.

As will be apparent from the description below, the alignment adjusting device is designed such that during the alignment process a flange 1 can remain mounted at the not shown optics assembly, i.e. without removing the connection, and without exchanging any components of the alignment adjusting device or the optics.

Figure 7:
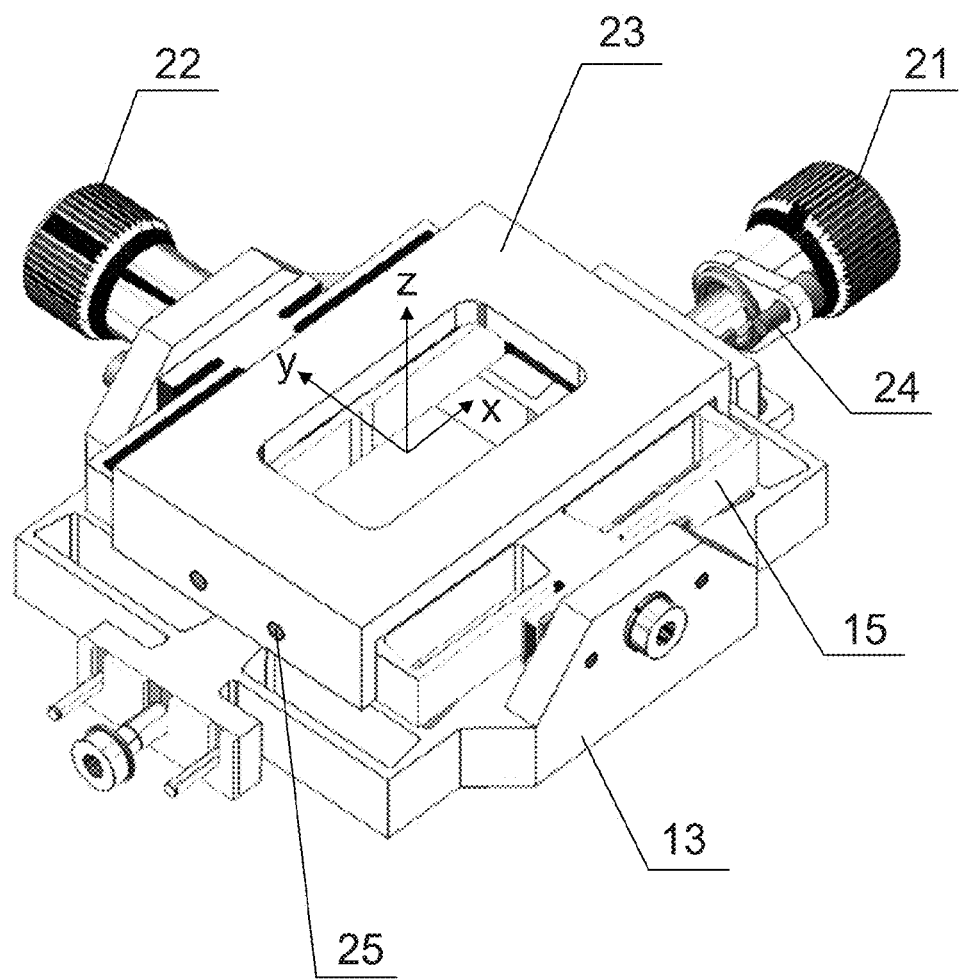
FIG. 7 shows a perspective view of two flexible joints where one of the flexible joints is connected to a detector support.

The alignment adjusting device allows for adjusting the position and orientation of the detector image area which is in the x-y-plane or parallel to the x-y-plane as illustrated in FIG. 7 in all six degrees of freedom. The detector 2 can be seen in FIG. 3. The six degrees of freedom are translational movement in x-, y- and z-direction as well as a rotational movement around the x-, y- and z-axes with respect to the Cartesian reference frame illustrated in FIGS. 1, 3 and 7. It is to be noted that each degree of freedom can be adjusted independently and in any arbitrary sequence.

The alignment adjusting device as shown in FIGS. 1 to 7 will be connected to the optics assembly by means of the already mentioned flange 1. The connection is made via mounting bolts 3. As can be seen best from FIGS. 2 and 4, a number of equidistantly distributed mounting bolts 3 are arranged along the circumference of the substantially circular flange 1. As a result, the flange 1 is stationary relative to the optics assembly.

For enabling an independent adjusting of the position and orientation of the detector support 23 (see FIG. 7) and the detector 2, respectively, the alignment adjusting device comprises a plurality of members enabling the adjustment.

The plurality of members consists of an intermediate ring 8 which is connected to the flange 1. The connection of the intermediate ring 8 to the flange 1 is made by means of detachable lock bolts 9. They can be seen from FIGS. 1 and 2.

The plurality of members consists of an outer frame 4 which is firmly connected to the intermediate ring 8. As can be seen from FIGS. 1, 2, 3 and 5, the outer frame 4 has a substantially cylindrical shape.

As a further member, an inner frame 12 is coaxially arranged to the outer frame 4. The inner frame has a substantially cylindrical shape, too. The inner frame 12 is connected to the outer frame 4 by means of three equidistantly distributed adjusting devices enabling an adjustment of the inner frame together with further members which are connected to the inner frame. The adjusting devices which will be described in more detail below allows an adjustment along the z-axis as well as a tilt around x- and y-axes.

In addition, the plurality of members comprises as the above mentioned further members a first and a second flexible joint 13, 15. The first flexible joint 13 is connected to the inner frame 12 (see FIG. 5). The second flexible joint 15 is connected to the first flexible joint 13 and is adapted to be connected to the detector support 23. This can be best seen from FIGS. 3 and 7.

An alignment around the z-axis is adjusted by rotating the outer frame 4 which is firmly connected to the intermediate ring 8 relative to the flange 1. For this purpose, the lock bolts 9 are released while the mounting bolts 3 remain tightened. The rotation around the z-axis is induced by a tangential adjustment of the intermediate ring which is centered by leaf springs 11 (see FIGS. 1 and 2) providing flexibility only for this degree of freedom. The alignment around the z-axis is fixed by torque wrenching the lock bolts 9.

The tangential movement of the intermediate ring 8 is induced with three adjusting mechanisms which are equidistantly distributed along the circumference of the flange 1.

Each of the adjusting mechanisms comprises a spring plunger 18 and a micrometer screw 20 acting on an adjustment bar 19 of the intermediate ring 8. The adjustment bar 19 is an integral part of the intermediate ring 8. The adjusting mechanism, i.e. the spring plunger 18, is mounted to the flange 1. The adjusting mechanism can be removed from the flange 1 when the lock bolts 9 are fixed, i.e. after completion of the alignment process. By actuating the micrometer screws 20 a movement in tangential direction by forces generated by the micrometer screws 20 and the spring plunger 18 is realized.

Adjusting in direction of z-axis as well as a tilt around x- and y-axes is made by means of the three equidistantly distributed adjusting devices, each of them comprising a micrometer screw 6 (see FIGS. 1, 2, 4 and 6). A translational movement along the z-axis is achieved by a synchronous actuation of the micrometer screws 6 whereas for a tilt around the x- and y-axes the micrometer screws 6 have to be individually actuated. The micrometer screws are extending flexible joints 5 connected with the inner frame 12 via corresponding mounts 7. The flexible joints 5 and the mounts 7 are part of the already mentioned adjusting device. They can be seen best from FIGS. 1, 2 and 4.

Figure 1:
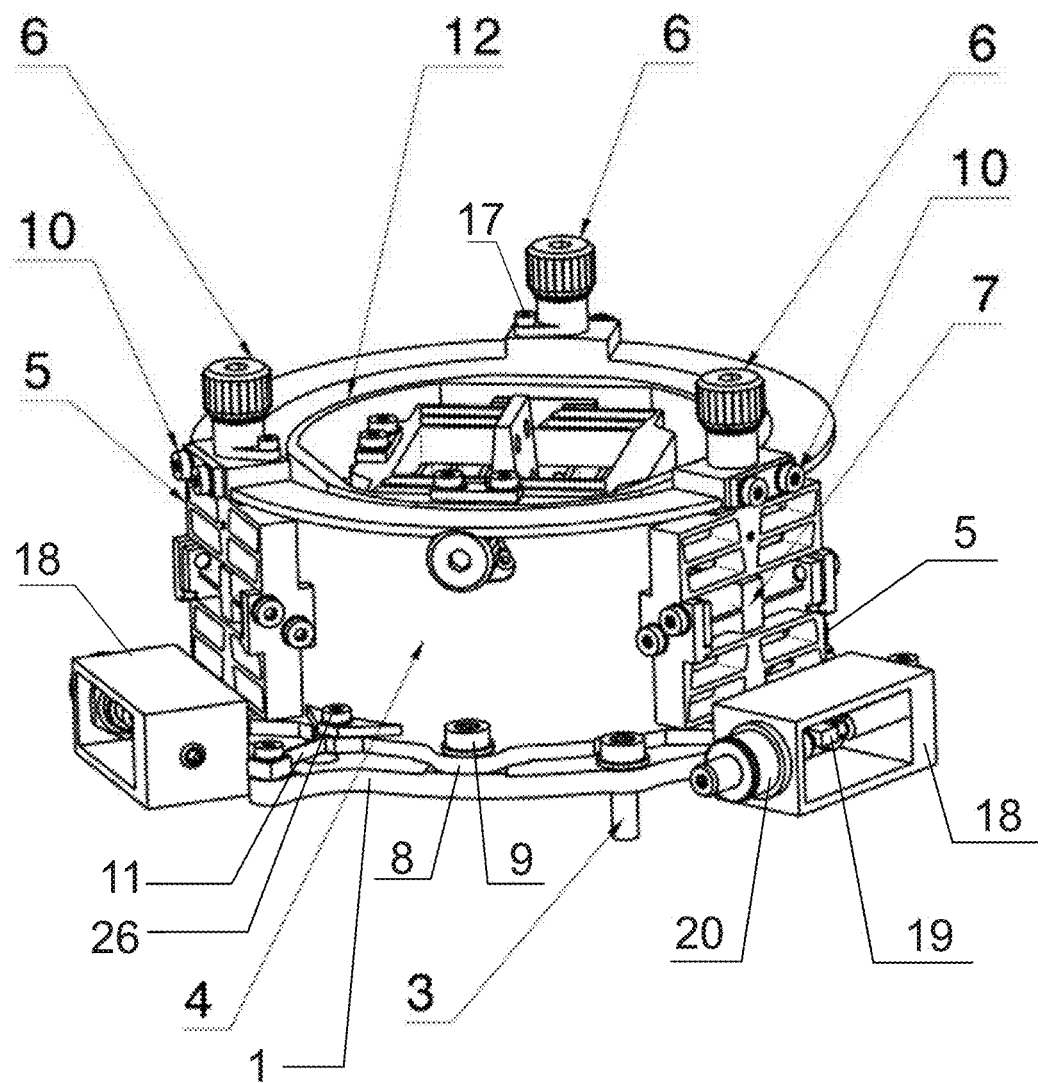
FIG. 1 shows a perspective view of an alignment adjusting device according to an embodiment of the invention.

The design of the flexible joints 5 is such that a movement in z-direction at the mounts 7 is reduced to one half of the translational movement caused by the corresponding micrometer screws 6. The design of the mounts 7 is such that the inner frame 12 remains centered and any rotation around the z-axis is blocked. The alignment adjusted by the micrometer screws 6 is fixed by torque wrenching the lock bolts 10 which are illustrated in FIGS. 1, 2 and 4.

The design of the micrometer screws 6 is such that they can be demounted after alignment fixation by unscrewing bolts 17 (see FIGS. 1 and 2) without disturbing the alignment.

Figure 2:
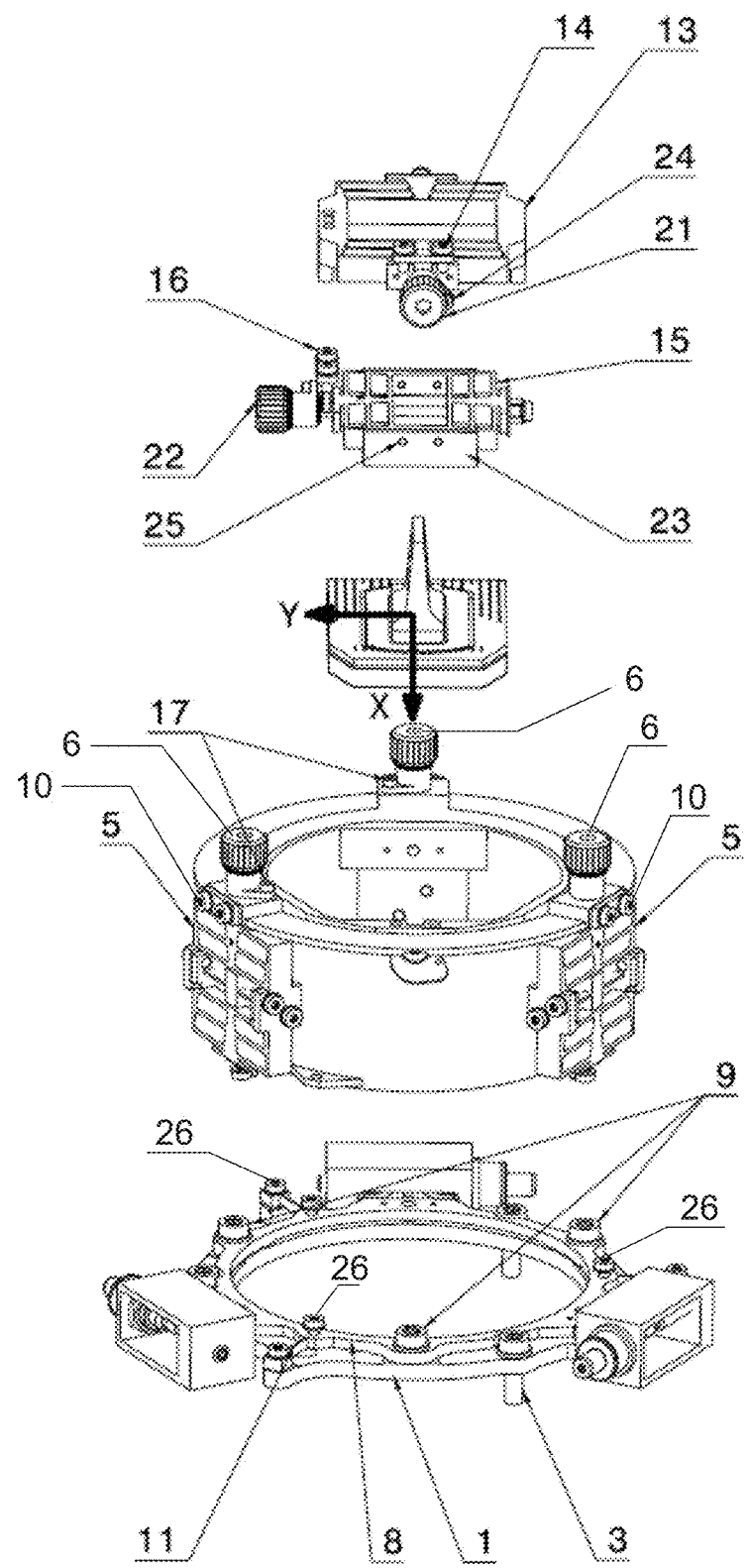
FIG. 2 shows an exploded perspective view of the alignment adjusting device of FIG. 1.
Figure 6:
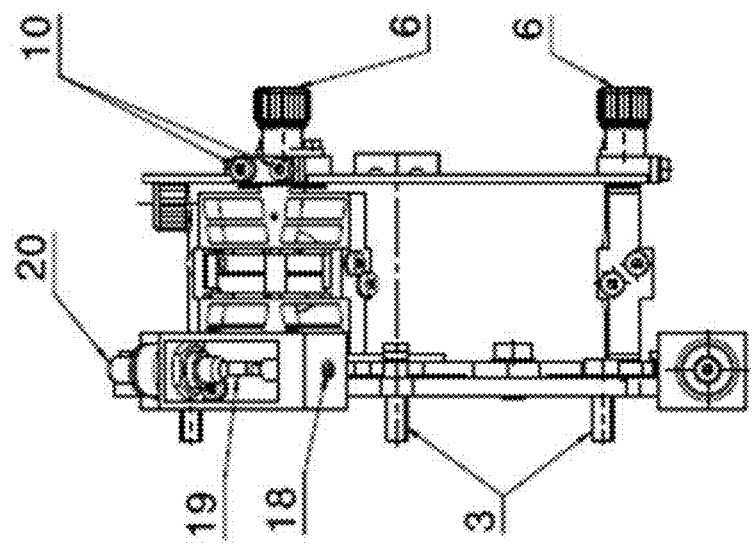
FIG. 6 shows a side view of the device shown in FIG. 5.
Figure 5:
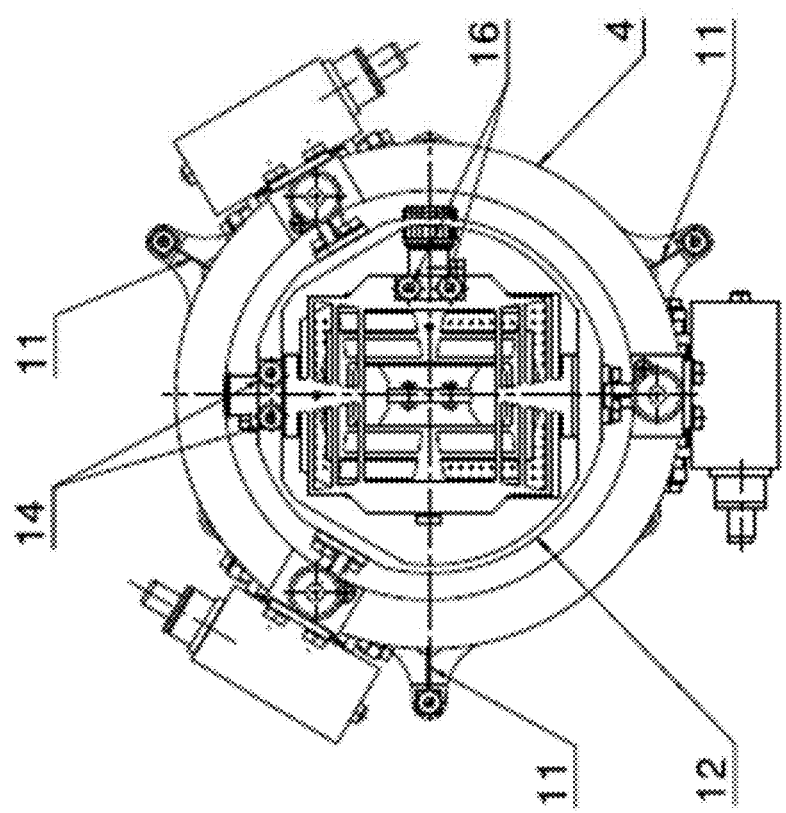
FIG. 5 shows a plane view of the device from the back.

The translational alignment in x- and y-direction is adjusted by means of micrometer screws 21, 22 which are shown in FIGS. 2, 3 and 7. The micrometer screws 21, 22 are extending the corresponding flexible joints 13 and 15. As can be seen best from FIG. 7, the micrometer screw 21 is assigned to the flexible joint 13 whereas the micrometer screw 22 is assigned to the flexible joint 15. As can be seen from this figure, the detector support 23 is attached to the flexible joint 15 by means of fasteners 25. As can be seen from FIG. 7, due to the kind of connection between the flexible joints 13, 15, the flexible joint 15 can be moved along the y-axis with regard to the flexible joint 13 by actuating micrometer screw 22. On the other hand, by actuating the micrometer screw 21 and due to the kind of connection of the flexible joint 13 to the inner frame 12, a movement along the x-axis can be made.

The design of the flexible joints 13, 15 is such that the x- and y-movement at the mounting interface to the detector support 23 is reduced to one half of the translational movements caused by the micrometer screws. The alignment adjusted by the micrometer screws 21, 22 is fixed by torque wrenching lock bolts 14 and 16 which can be seen in FIG. 2.

The design of the micrometer screws 21, 22 is such that they can be demounted after alignment fixation by unscrewing bolts 24 which are shown in FIGS. 2 and 7. It is clear that unscrewing the bolts 24 does not disturb the alignment.

The detector support 23 which is intended to receive the detector 2 (FIG. 3) is attached close to the center of the flexible joint 15 by the dedicated fasteners 25 shown in FIG. 7.

LIST OF REFERENCE SIGNS

1 Flange
2 Detector
3 Mounting Bolt
4 Outer Frame
5 Flexible Joint $Z_{trans}$, $X_{rot}$, $Y_{rot}$
6 Micrometer Screw $Z_{trans}$, $X_{rot}$, $Y_{rot}$
7 Mount
8 Intermediate Ring
9 Lock Bolt $Z_{rot}$
10 Lock Bolt $Z_{trans}$, $X_{rot}$, $Y_{rot}$
11 Leaf Spring
12 Inner Frame
13 Flexible Joint $X_{trans}$
14 Lock Bolt $X_{trans}$
15 Flexible Joint $Y_{trans}$
16 Lock Bolt $Y_{trans}$
17 Bolt
18 Spring Plunger
19 Adjustment Bar
20 Micrometer Screw $Z_{trans}$
21 Micrometer Screw $X_{trans}$
22 Micrometer Screw $Y_{trans}$
23 Detector Support
24 Bolt
25 Fastener
26 Bolt

What is claimed is:

1. An alignment adjusting device for an optical focal plane assembly, which is adapted to be integrated in the optical focal plane assembly having a detector with a detector plane and is adapted to be mounted to an optics assembly having an optical focal plane, the alignment adjusting device being adapted to allow an alignment of the detector plane representing an image area and the optical focal plane, the alignment adjusting device comprising:
   a detector support configured to receive the detector;
   a plurality of members, a first member of the plurality of the members being connected to the detector support and a second member of the plurality of the members being connected to a flange that is adapted to be connected to the optics assembly; wherein
   the first member, the second member and a remaining number of the members being pairwise moveably connected to each other by a number of springs and/or a number of supporting elements, the number of springs and/or the number of supporting elements being adapted to enable a relative translational movement along axes of a given coordinate system and/or a relative rotational movement around the axes of the given coordinate system between the detector plane and the optical focal plane, wherein
   the plurality of members comprise:
      an intermediate ring representing the second member being connected to the flange by way of detachable lock bolts;
      an outer frame being firmly connected to the intermediate ring and having a substantially cylindrical shape;
      an inner frame being coaxially arranged within the outer frame and having a substantially cylindrical shape extending parallel to the outer frame, the inner frame being connected to the outer frame by at least one adjusting device, which is oriented coaxially with the inner frame and outer frame;
      a first flexible joint connected to the inner frame; and
      a second flexible joint representing the first member.

2. The alignment adjusting device according to claim 1, wherein the number of springs is adapted to enable the rotational movement around only one of the axes.

3. The alignment adjusting device according to claim 2, wherein the number of supporting elements is adapted to enable the translational movement in only one direction and/or to enable the rotational movement around only one of the axes.

4. The alignment adjusting device according to claim 1, wherein the number of supporting elements is adapted to enable the translational movement in only one direction and/or to enable the rotational movement around only one of the axes.

5. The alignment adjusting device according to claim 4, wherein each of the remaining number of members is connected to exactly two other of the members.

6. The alignment adjusting device according to claim 1, wherein the plurality of members are rotatable around a first axis with respect to the flange by releasing the lock bolts and tangential adjustment of the intermediate ring by one or more adjusting mechanisms.

7. The alignment adjusting device according to claim 6, wherein each of the adjusting mechanisms comprises a spring plunger and a first micrometer screw acting on an adjustment bar of the intermediate ring.

8. The alignment adjusting device according to claim 7, wherein the inner frame is connected to the outer frame by three equidistantly distributed adjusting devices enabling an adjustment of the inner frame, the first flexible joint and the second flexible joint along the first axis as well as a tilt around a second and a third axis.

9. The alignment adjusting device according to claim 8, wherein each adjusting device comprises a third flexible joint, a second micrometer screw and a mount, wherein the inner frame is connected with the mount and wherein the third flexible joint is adjustable by the micrometer screw.

10. The alignment adjusting device according to claim 9, wherein the second micrometer screw extends the third flexible joint.

11. The alignment adjusting device according to claim 9, wherein the three adjusting devices are mounted to the outer frame and wherein the corresponding second micrometer screws are removable from the outer frame when the lock bolts are fixed.

12. The alignment adjusting device according to claim 9, wherein the first flexible joint is connected to the inner frame such that, when actuating a corresponding third micrometer screw, a translational movement along the second axis is achieved.

13. The alignment adjusting device according to claim 12, wherein the second flexible joint is connected to the first flexible joint such that, when actuating a corresponding fourth micrometer screw, a translational movement along the third axis is achieved.

14. The alignment adjusting device according to claim 12, wherein the third and/or a fourth micrometer screw are removable after alignment fixation by unscrewing the corresponding bolts.

15. The alignment adjusting device according to claim 13, wherein the third and/or the fourth micrometer screws are removable after alignment fixation by unscrewing the corresponding bolts.

16. The alignment adjusting device according to claim 1, wherein each of the remaining number of members is connected to exactly two other of the members.

17. The alignment adjusting device according to claim 6, wherein the adjusting mechanisms are mounted to the flange and are removable from the flange when the lock bolts are fixed.

18. The alignment adjusting device according to claim 8, wherein the alignment adjusted by the three adjusting device is fixed by corresponding lock bolts.

19. The alignment adjusting device according to claim 1, wherein the detector support is attached close to the center of the flexible joint.

* * * * *